Figure 2:
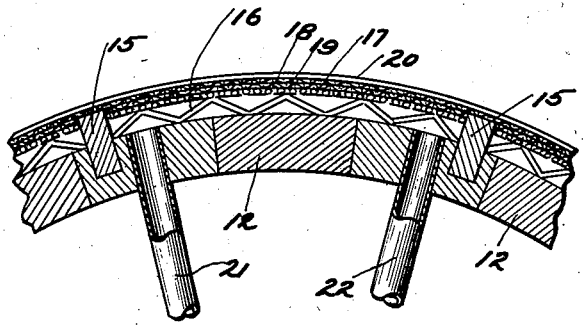

W. A. SCOTT.
ORE CONCENTRATION PROCESS.
APPLICATION FILED SEPT. 10, 1917. RENEWED SEPT. 15, 1920.

1,375,233.

Patented Apr. 19, 1921.

Witness:
CC Burnap

Inventor:
Walter A. Scott

UNITED STATES PATENT OFFICE.

WALTER A. SCOTT, OF CHICAGO, ILLINOIS, ASSIGNOR TO MINERAL SEPARATION, NORTH AMERICAN CORPORATION, A CORPORATION OF MARYLAND.

ORE-CONCENTRATION PROCESS.

1,375,233.     Specification of Letters Patent.     Patented Apr. 19, 1921.

Application filed September 10, 1917, Serial No. 190,438. Renewed September 15, 1920. Serial No. 410,486.

*To all whom it may concern:*

Be it known that I, WALTER A. SCOTT, a citizen of the United States, residing at Chicago, in the county of Cook and State of Illinois, have invented certain new and useful Improvements in Ore-Concentration Processes, of which the following is a specification.

My invention consists of an improved process for concentrating ores. Heretofore processes have been devised and used for concentrating ores by means of the flotative power of bubbles of gas introduced into a freely flowing ore pulp, such processes being useful particularly in connection with ores or intermediate mill products containing sulfids of metals, free metals and graphite. In such processes, ordinarily known as flotation processes, the mineral has been saved by permitting the rising gaseous bubbles with the adhering mineral to form a froth floating upon the top of the pulp, which froth or float is then removed by overflow, skimming or other convenient means.

I have found that methods heretofore in use, such as above described, for removing the floating froth have in some instances involved the removal with the bubbles and other adhering mineral of considerable gangue, the contamination of the concentrate with gangue being due in a large degree to the removal of more or less of the pulp with the bubbles when they are overflowed or otherwise removed. My improved process and apparatus bring about the removal of the valuable mineral adhering to the bubbles with a minimum contamination with gangue, and the nature of my invention will be apparent from the following description and drawings taken in connection with the accompanying claims.

In the drawings—

Figure 1:
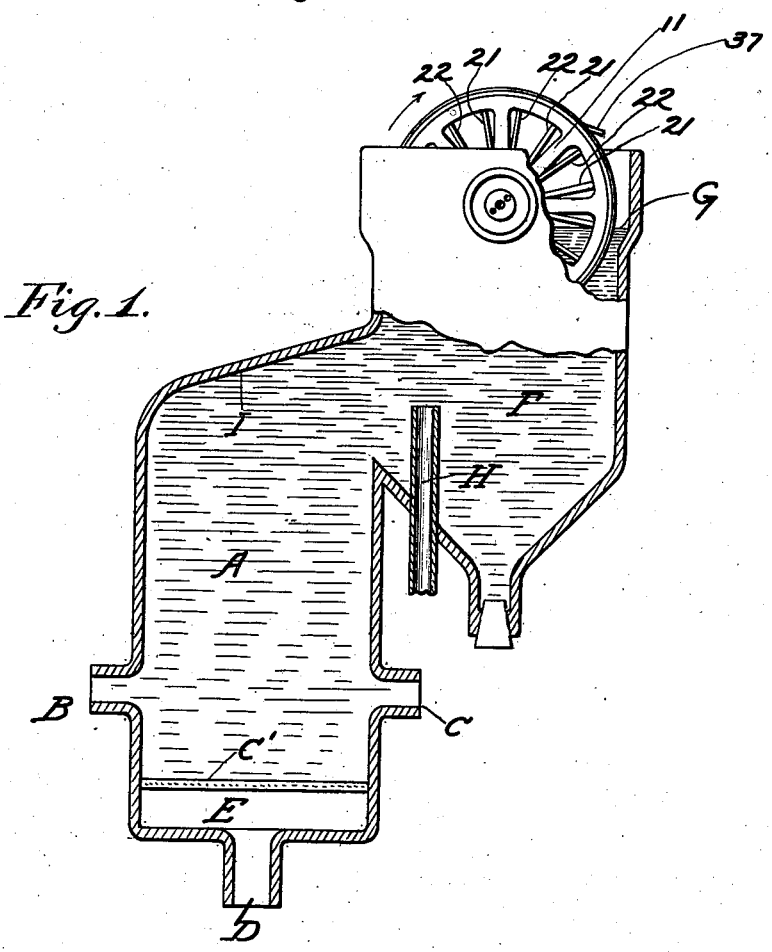

Figure 1 is a cross-sectional view of an apparatus adapted for use in practising my improved process, and Fig. 2 is a detail view of a part of the mechanism shown in Fig. 1.

Referring to Fig. 1, A is a vessel into which the freely flowing pulp is introduced through the port B and discharged through the port C. The vessel A is provided in its lower wall with an air inlet D and just above the air inlet is a porous medium C' forming a partition transversely of the vessel A. Between the porous medium C' and the bottom of the vessel A there is an air compartment E. The arrangement of the porous medium C' in relation to the pulp vessel A is not novel, being an arrangement used in connection with the flotation process as now practised. Adjoining the vessel A and communicating therewith near its upper end is a collecting chamber F. The supply of pulp flowing through the apparatus is so regulated as to maintain the pulp level at about the point indicated by the letter G. The arrangement is such that the concentrate collecting chamber F, while communicating with and forming a continuous vessel with the cell A, forms a pocket separated from the current of pulp through the apparatus. By this means the pulp in the collecting chamber F is substantially stagnant and after the apparatus is once put in operation comparatively little pulp is either withdrawn from or supplied to the chamber F. The water originally entering the chamber F when the apparatus is first charged remains there with relatively little change, such change as occurs being due to such slight eddies as are formed and to the replacement of the relatively small amount of water withdrawn in collecting the concentrate from the bubbles as hereinafter described. If desirable, the entry of additional raw pulp into the compartment F after the apparatus is started in operation may be largely counteracted by supplying clear water to said compartment through a pipe H or otherwise.

In the upper part of the collecting chamber F I mount a continuous vacuum filter of any convenient type. The filter is arranged with its porous medium beneath the surface G of the pulp in the chamber F whereby the gaseous bubbles rising through the pulp in the compartment A and deflected into the collecting chamber F by the inclined wall I contact with the porous filter medium in their upward course in the collecting chamber F. Upon contacting with the porous filter medium the partial vacuum within the filter withdraws the gas from the bubbles and causes the mineral carried by the bubbles to adhere to the filter surface. The mineral may then be recovered from the filter surface in any convenient manner.

For the purpose of concretely illustrating a mechanism suitable for conducting the above operation I have illustrated a continuous rotary filter of a form now in common use and described in United States Patent No. 919,628 granted to E. L. Oliver April 27, 1909. The construction of such filters is well known and fully explained in the patent referred to and I shall, therefore, but briefly refer herein to the details of construction. The filter consists of a rotary drum which is caused to rotate by any convenient means. The cylindrical surface of the drum is supported by a number of spiders 11, one at each end preferably and as many intermediate ones as necessary. The periphery of the drum is represented as constructed of a series of staves 12 supported directly upon the spiders and outside of the wall formed by the staves a number of filter sections are constructed by means of cleats 15 projecting from the outer surface formed by the staves, the cleats lying parallel with the axis of the drum. In order to support the outer porous medium some suitable form of spacer is introduced between the cleats 15, such spacer in the present instance being represented as taking the form of strips of expanded metal 16. Upon the expanded metal is placed a section of wire cloth 17 and upon the wire cloth are placed sections of burlap 18. Around the whole drum is wound canvas 19 and around the canvas there is wound helically from one end of the drum to the other a wire 20 which lies upon and projects from the surface of the canvas. The shaft which forms the axis of the filter drum is hollow and has one of its ends closed. Through its other end enter a number of pipes, these pipes being divided into two series, one for exhausting air from the filter sections formed by the cleats 15 in connection with the staves 12 and the porous covering of the drum and the other series serving to supply pressure to the interior of the filter sections. There is one pressure pipe and one suction pipe for each filter section, the pipes extending into the hollow shaft and thence passing outwardly radially through its wall and passing through the impervious stave periphery of the drum. Suitable valve mechanism is provided, a form of such valve mechanism being described in the Oliver patent referred to, whereby the filter sections, while submerged beneath the surface of the pulp, are subjected to a lowering of air pressure, and during a part of their travel above the surface of the pulp are subjected to air pressure. The arrangement is such that the suction pipe valves are opened while their connected filter sections are submerged, the pressure pipes being closed at this time, and the pressure pipe valves are opened during part of the travel of their connected filter sections above the surface of the pulp, the suction valves for any section, of course, being closed when the pressure valves are opened. The suction and pressure pipes are designated upon the drawing by the numerals 21 and 22 respectively. In operation the part of the rotary filter below the pulp level G as shown in Fig. 1 is subjected to suction, thus extracting the air from the mineral carrying bubbles and causing the concentrate to adhere to the filter surface. As the drum rotates in the direction indicated by the arrow the various filter sections are successively carried above the surface of the pulp and while the sections are above the surface of the pulp the concentrate is removed therefrom. The arrangement of suction and pressure valves is such that for a certain interval during the travel of the filter sections above the surface of the pulp air pressure is substituted for suction, thus loosening the mineral collected upon the filter surface, and the removal of the mineral from the filter surface may be facilitated by the employment of some form of scraper, such as indicated at 37. In using filters of the type described in connection with the cyanid process it is sometimes desirable to supply wash solution to the mineral adhering to the part of the filter surface above the pulp level, but this expedient will be found unnecessary in the use of such filters for the purpose of my invention, inasmuch as my improved process is for the purpose of saving the solid sulfids as distinguished from saving a solution as in the cyanid process. Such washing, however, may in some instances be employed in connection with my process, but ordinarily is not necessary.

My improved process has the advantage of collecting the mineral carried by the bubbles free from any contaminating pulp and the further advantage of delivering the concentrates almost free from water. The concentrates initially recovered by my improved process may, of course, be mixed with clear water and re-concentrated by the same method for the purpose of obtaining a higher grade, but the process itself is the same in its application to the original pulp and to concentrates previously recovered by my process or by other means.

While I have herein referred to the use of a form of continuous rotary filter such as described in the Oliver patent, it will be apparent that the practice of my improved process is not dependent upon the use of this particular form of vacuum filter. It is only necessary that means be provided for interposing in the path of the rising bubbles some porous medium upon one side of which the air pressure may be reduced to create the suction necessary for extracting the air from the bubbles and breaking them and causing the mineral carried by the bubbles to adhere to said medium. In applying the process to any particular ore the speed of rotation of the rotary filter, when a rotary filter is used, and the degree of vacuum and pressure to be applied to the filter sections may easily be determined by a few tests under different conditions, it being desirable, of course, to collect the mineral carried by the bubbles without removing from the pulp any more water than necessary.

My invention is applicable in connection with any of the reagents or means of using reagents employed in the flotation process. Ordinarily some so-called modifying agent or oil is mixed with the pulp to cause the gaseous bubbles to collect the metalliferous or other desired mineral as distinguished from the gangue. In practising my improved process the modifying agent or oil may be mixed with the pulp by mechanical means, the modifying agent may be soluble or insoluble or the modifying agent may take the form of a gas mixed with the air prior to its introduction into the pulp through the porous medium C, and the gas used as a modifying agent may be either the vapor of some substance which is liquid under ordinary conditions or it may be a permanent gas, that is, a substance which is gaseous under ordinary conditions of temperature and pressure.

While I have described one means of introducing air or other gas into the pulp my invention is not confined to that particular means, and is equally applicable when the air or other gas is introduced by mechanical agitation, or is chemically or electrolytically generated in the pulp or otherwise formed in or introduced into the pulp.

What I claim is:

1. A process of concentrating ores comprising the operations of introducing a gas into an ore pulp, removing the gas from the mineral-carrying bubbles so formed before said bubbles reach the surface of the pulp, and separating the mineral carried by the bubbles from the remainder of the ore.

2. A process of concentrating ores comprising the operations of introducing a gas into a body of ore pulp, interposing within said pulp body in the path of the mineral-carrying bubbles so formed a porous medium and reducing the pressure on one side of said medium whereby the mineral carried by said bubbles is caused to adhere to said porous medium.

3. A process of concentrating ores comprising the operations of introducing a gas into a body of ore pulp, interposing within said pulp body in the path of the mineral-carrying bubbles so formed a porous medium, reducing the pressure on one side of said medium whereby the mineral carried by said bubbles is caused to adhere to said porous medium, and recovering the mineral adhering to said medium.

4. A process of concentrating ores comprising the operations of introducing a gas into a body of ore pulp, interposing within said pulp body in the path of the mineral-carrying bubbles so formed a porous medium, reducing the pressure on one side of said medium whereby the mineral carried by said bubbles is caused to adhere to said porous medium, removing said medium from the pulp and applying gaseous pressure to the side thereof opposite the adhering mineral.

5. A process of concentrating ores comprising the operations of introducing a gas into a body of ore pulp, interposing within said pulp body in the path of the mineral-carrying bubbles so formed a series of compartments each having a porous wall, moving said compartments progressively beneath and above the surface of said pulp, diminishing the pressure within said compartments while submerged and increasing said pressure at a time when said compartments are above the surface of said pulp.

In testimony whereof, I have subscribed my name.

WALTER A. SCOTT.

---

It is hereby certified that the name of the assignee in Letters Patent No. 1,375,233, granted April 19, 1921, upon the application of Walter A. Scott, of Chicago, Illinois, for an improvement in "Ore-Concentration Processes," was erroneously written and printed as "Mineral Separation, North American Corporation, a corporation of Maryland," whereas said name should have been written and printed as *Minerals Separation, North American Corporation, a corporation of Maryland*, as shown by the records of assignments in this office; and that the said Letters Patent should be read with this correction therein that the same may conform to the record of the case in the Patent Office.

Signed and sealed this 20th day of October, A. D., 1921.

[SEAL.]

WM. A. KINNAN,
*Acting Commissioner of Patents.*